US012191105B2

(12) United States Patent
Miyazaki et al.

(10) Patent No.: US 12,191,105 B2
(45) Date of Patent: Jan. 7, 2025

(54) SWITCH DEVICE

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Hisao Miyazaki, Yokohama Kanagawa (JP); Hisashi Yoshida, Kawasaki Kanagawa (JP); Shigeya Kimura, Yokohama Kanagawa (JP)

(73) Assignees: Kabushiki Kaisha Toshiba, Tokyo (JP); Toshiba Energy Systems & Solutions Corporation, Kawasaki (JP)

( * ) Notice: Subject to any disclaimer, the term of this patent is extended or adjusted under 35 U.S.C. 154(b) by 693 days.

(21) Appl. No.: 17/409,026

(22) Filed: Aug. 23, 2021

(65) Prior Publication Data

US 2022/0165532 A1 May 26, 2022

(30) Foreign Application Priority Data

Nov. 20, 2020 (JP) ................................ 2020-193009

(51) Int. Cl.
*H01J 17/10* (2006.01)
*H01J 17/20* (2012.01)
*H01J 17/48* (2006.01)

(52) U.S. Cl.
CPC .............. *H01J 17/10* (2013.01); *H01J 17/20* (2013.01); *H01J 17/48* (2013.01); *H01J 2217/40* (2013.01)

(58) Field of Classification Search
CPC ............ H01J 17/10; H01J 17/20; H01J 17/48; H01J 17/54; H01J 17/63; H01J 2217/40; H01T 2/02
See application file for complete search history.

(56) References Cited

U.S. PATENT DOCUMENTS

| | | | | |
|---|---|---|---|---|
| 5,075,594 A | | 12/1991 | Schumacher et al. | |
| 5,329,205 A | | 7/1994 | Goebel et al. | |
| 5,672,208 A | * | 9/1997 | Morita .................... | H01J 17/20 118/723 E |
| 9,418,806 B2 | | 8/2016 | Parashar | |
| 10,256,067 B1 | * | 4/2019 | Sommerer .............. | H01J 17/64 |
| 2020/0411284 A1 | | 12/2020 | Miyazaki et al. | |

FOREIGN PATENT DOCUMENTS

| | | | | |
|---|---|---|---|---|
| JP | H3-110737 A | | 5/1991 | |
| JP | H6-76745 A | | 3/1994 | |
| JP | 2014-516195 A | | 7/2014 | |
| JP | 2021-9990 A | | 1/2021 | |
| WO | WO-2016168376 A1 | * | 10/2016 | .............. H01J 1/304 |

OTHER PUBLICATIONS

M. Obara, "Chapter 8 Plasma," J. IEE Japan, vol. 107, No. 11, pp. 1136-1140 (1987).

* cited by examiner

*Primary Examiner* — Alexander H Taningco
*Assistant Examiner* — Pedro C Fernandez
(74) *Attorney, Agent, or Firm* — Finnegan, Henderson, Farabow, Garrett & Dunner, LLP

(57) ABSTRACT

According to one embodiment, a switch device includes a container configured to house a gas, a cathode located in the container, a first anode located in the container, and a second anode located in the container. A second direction from the cathode toward the second anode crosses a first direction from the cathode toward the first anode. A second distance between the cathode and the second anode is greater than a first distance between the cathode and the first anode.

19 Claims, 10 Drawing Sheets

FIG. 6A
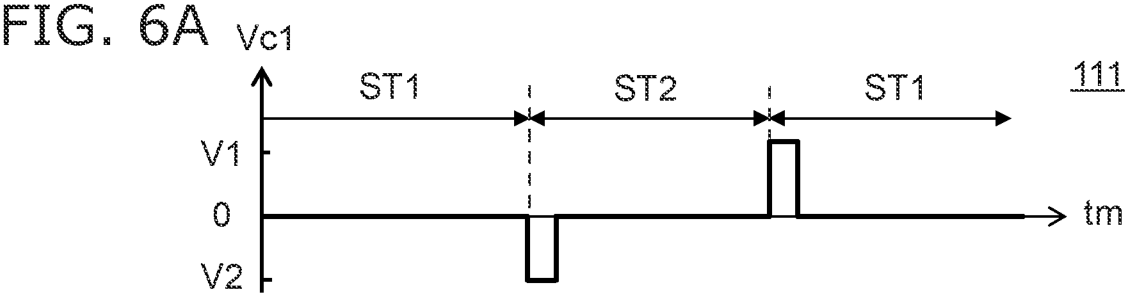
FIG. 6B
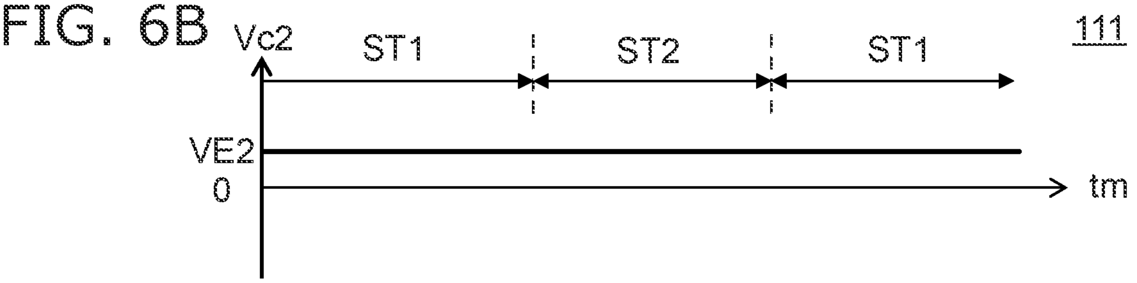
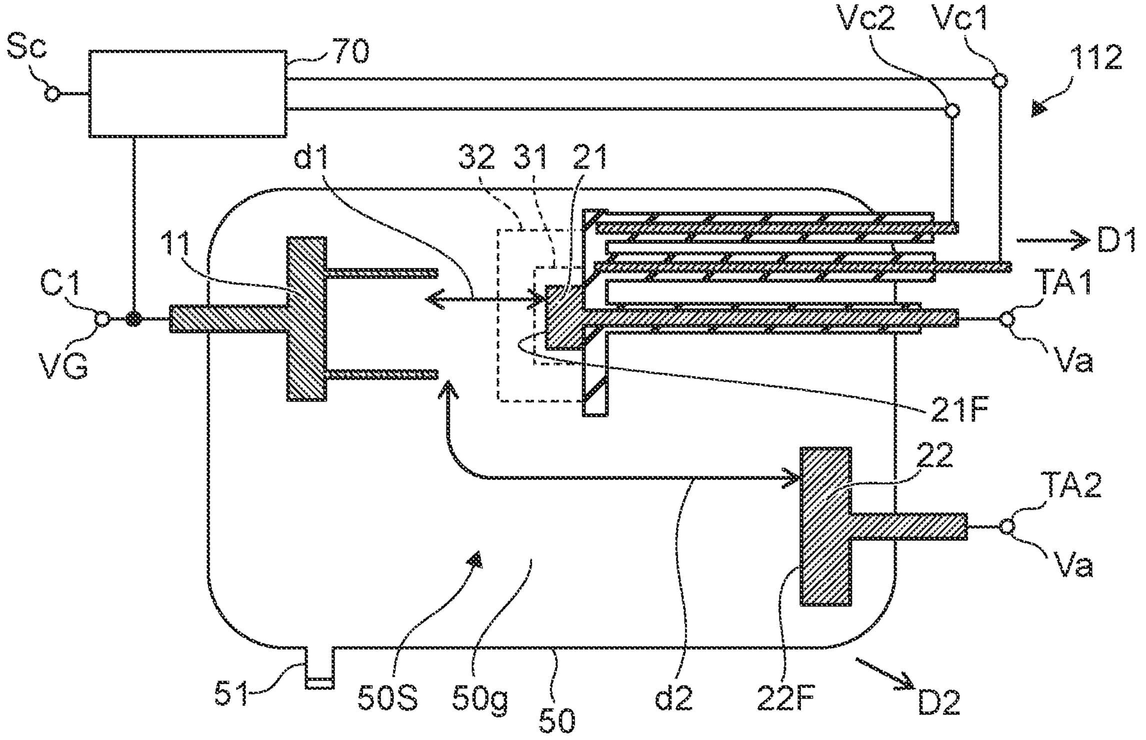
FIG. 7

SWITCH DEVICE

CROSS-REFERENCE TO RELATED APPLICATIONS

This application is based upon and claims the benefit of priority from Japanese Patent Application No. 2020-193009, filed on Nov. 20, 2020; the entire contents of which are incorporated herein by reference.

FIELD

Embodiments described herein relate generally to a switch device.

BACKGROUND

For example, there is a switch device such as a plasma switch or the like. It is desirable to improve the characteristics of the switch device.

BRIEF DESCRIPTION OF THE DRAWINGS

FIGS. 6A and 6B are graphs illustrating operations of the switch device according to the first embodiment;

FIG. 7 is a schematic cross-sectional view illustrating a switch device according to the first embodiment;

DETAILED DESCRIPTION

Figure 1:
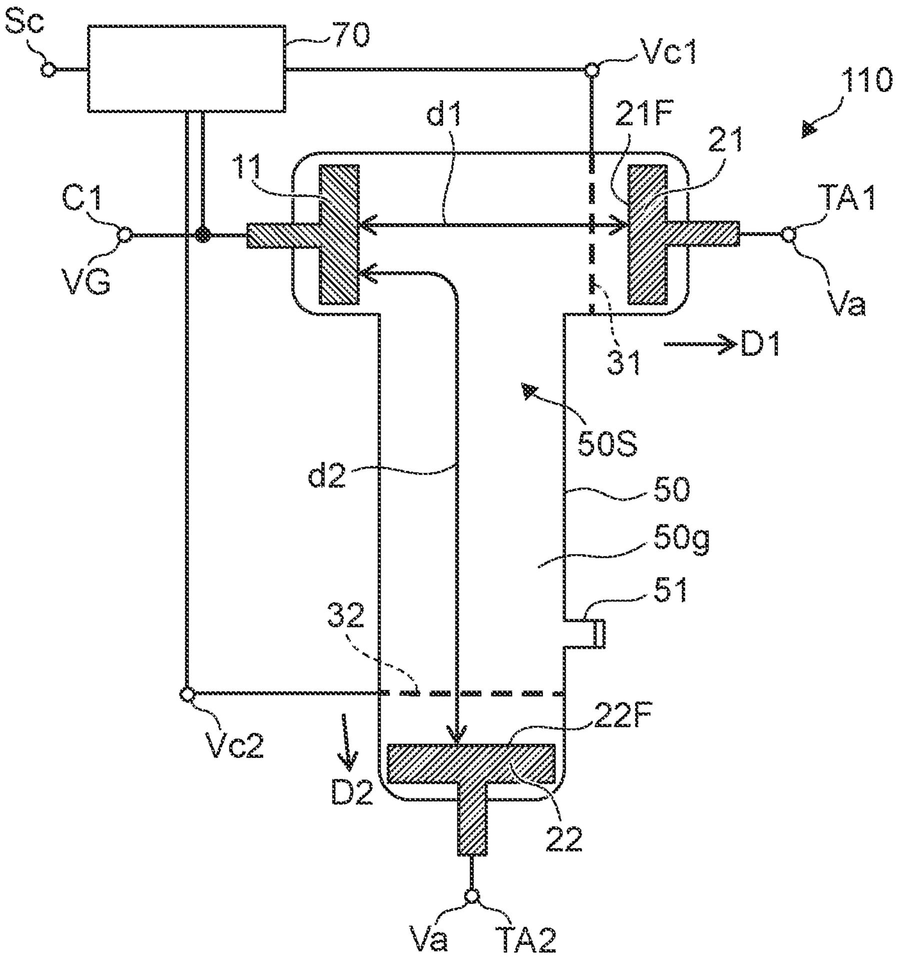
FIG. 1 is a schematic cross-sectional view illustrating a switch device according to a first embodiment.

According to one embodiment, a switch device includes a container configured to house a gas, a cathode located in the container, a first anode located in the container, and a second anode located in the container. A second direction from the cathode toward the second anode crosses a first direction from the cathode toward the first anode. A second distance between the cathode and the second anode is greater than a first distance between the cathode and the first anode.

According to one embodiment, a switch device includes a container configured to house a gas, a cathode located in the container, a first anode located in the container, a second anode located in the container, and an insulating member located between the cathode and the second anode.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

FIG. 1 is a schematic cross-sectional view illustrating a switch device according to a first embodiment.

As shown in FIG. 1, the switch device 110 according to the embodiment includes a container 50, a cathode 11, a first anode 21, and a second anode 22.

The container 50 is configured to house a gas 50*g*. The gas 50*g* is housed in a space in an interior 50S of the container 50. The gas 50*g* includes, for example, at least one of argon, helium, hydrogen, or deuterium. The switch device 110 may include the gas 50*g*. The gas 50*g* may be introduced to the container 50 when using the switch device 110. For example, the gas 50*g* may be introduced to the interior 50S of the container 50 through an inlet 51 provided in the container 50, etc. The inlet 51 may include an inlet/outlet. The container 50 is configured to airtightly maintain the space in the interior 50S of the container 50.

The cathode 11 is located in the container 50. For example, a cathode terminal C1 that is electrically connected with the cathode 11 is located outside the container 50.

The first anode 21 is located in the container 50. For example, a first anode terminal TA1 that is electrically connected with the first anode 21 is located outside the container 50.

The second anode 22 is located in the container 50. For example, a second anode terminal TA2 that is electrically connected with the second anode 22 is located outside the container 50.

For example, a voltage Va is applied between the cathode terminal C1 and the first anode terminal TA1. The voltage Va is applied between the cathode terminal C1 and the second anode terminal TA2. In one example, the cathode terminal C1 is set to a ground potential VG. The voltage Va is, for example, a positive voltage.

The direction from the cathode 11 toward the first anode 21 is taken as a first direction D1. The direction from the cathode 11 toward the second anode 22 is taken as a second direction D2. The second direction D2 crosses the first direction D1.

As described below, a state (e.g., an on-state) in which a current flows between the cathode 11 and the second anode 22 can be formed. The direction of the current path between the cathode 11 and the second anode 22 crosses the first direction D1.

As shown in FIG. 1, the distance between the cathode 11 and the first anode 21 is taken as a first distance d1. The distance between the cathode 11 and the second anode 22 is taken as a second distance d2.

These distances may be the shortest distance between the two electrodes. In such a case, the first distance d1 is the shortest distance between the cathode 11 and the first anode 21; and the second distance d2 is the shortest distance between the cathode 11 and the second anode 22.

These distances may be the length along the current path formed between the two electrodes. In such a case, the first distance d1 is the length along the current path between the cathode 11 and the first anode 21; and the second distance d2 is the length along the current path between the cathode 11 and the second anode 22.

Switching of the current path is possible in the switch device 110 that has such a configuration. For example, a first state and a second state can be formed in the switch device 110. For example, the current path between the cathode 11 and the second anode 22 is substantially blocked in the first state. In the second state, for example, the current can flow in the current path between the cathode 11 and the second anode 22. The first state is, for example, the off-state. The second state is the on-state. These states can be switched. For example, plasma is generated in at least a portion of the space between the cathode 11 and the second anode 22 in the second state. The plasma is at least a portion of the current path.

According to the embodiment as described below, the current path can be effectively blocked. For example, the resistance in the off-state can be high. For example, a power-conserving switch device can be provided thereby. A switch device can be provided in which the characteristics can be improved.

For example, there is a reference example in which the width of the current path based on the plasma is controlled. In the reference example, plasma exists even in the off-state. Because plasma exists even in the off-state, the electrodes deteriorate easily due to the plasma. Therefore, it is difficult to provide a sufficiently long life.

Conversely, according to the embodiment, it is possible to substantially not generate plasma in the off-state. According to the embodiment, a long life is easily obtained because the deterioration of the electrodes due to the plasma can be suppressed.

The first anode 21 and the second anode 22 are provided in the embodiment. Because multiple anodes are provided, for example, the second anode 22 that can form the on-state can be set to a more appropriate state. For example, the current that flows between the cathode 11 and the second anode 22 in the on-state can be increased. The switching of a larger current is possible. According to the embodiment, a switch device can be provided in which the characteristics can be improved.

For example, the switching of the first state and the second state is performed by conductive parts, etc., that are described below.

In the example as shown in FIG. 1, the switch device 110 includes a first conductive part 31. The position in the first direction D1 of the first conductive part 31 is between the position in the first direction D1 of the cathode 11 and the position in the first direction D1 of the first anode 21. For example, the first conductive part 31 is between the cathode 11 and the first anode 21 in the first direction D1. For example, the first conductive part 31 may be between the cathode 11 and the first anode 21 in the current path between the cathode 11 and the first anode 21. For example, the first conductive part 31 is between the cathode 11 and the first anode 21 in the container 50. The first conductive part 31 may be, for example, a first grid.

As described below, the states described above can be switched by the potential of the first conductive part 31.

As shown in FIG. 1, the switch device 110 may further include a second conductive part 32. The position in the second direction D2 of the second conductive part 32 is between the position in the second direction D2 of the cathode 11 and the position in the second direction D2 of the second anode 22. For example, the second conductive part 32 is between the cathode 11 and the second anode 22 in the second direction D2. For example, the second conductive part 32 may be between the cathode 11 and the second anode 22 in the current path between the cathode 11 and the second anode 22. For example, the second conductive part 32 is between the cathode 11 and the second anode 22 in the container 50. The second conductive part 32 may be, for example, a second grid. For example, the first conductive part 31 and the second conductive part 32 are located in the container 50.

As described below, the states described above may be switched by a combination of the potential of the first conductive part 31 and the potential of the second conductive part 32.

As shown in FIG. 1, the switch device 110 may include a controller 70. The controller 70 is electrically connected with the first conductive part 31. The controller 70 is configured to control the potential of the first conductive part 31. The potential of the first conductive part 31 is, for example, a potential that is referenced to the potential of the cathode 11.

The controller 70 may be electrically connected with the second conductive part 32. The controller 70 is configured to control the potential of the second conductive part 32. The potential of the second conductive part 32 is, for example, a potential that is referenced to the potential of the cathode 11.

As shown in FIG. 1, a control signal Sc is supplied to the controller 70. The controller 70 is configured to control the potential of at least one of the first conductive part 31 or the second conductive part 32 based on the control signal Sc.

FIGS. 2A to 2E are graphs illustrating operations of the switch device according to the first embodiment.

Figure 2A:
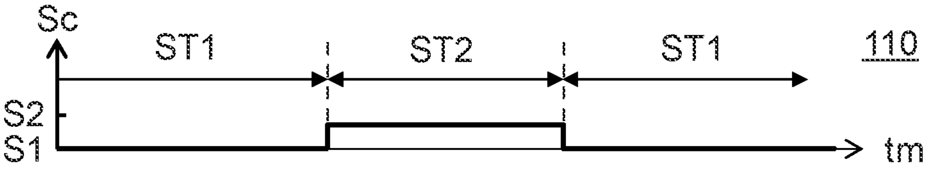
FIGS. 2A to 2E are graphs illustrating operations of the switch device according to the first embodiment.

In these figures, the horizontal axis is a time tm. In these figures, the time tm is shown to illustrate the change of the states that are formed. In these figures, the time tm is arbitrary. The vertical axis of FIG. 2A is the control signal Sc. The vertical axis of FIG. 2B corresponds to a potential Vc1 of the first conductive part 31 (referring to FIG. 1). The vertical axis of FIG. 2C corresponds to a potential Vc2 of the second conductive part 32 (referring to FIG. 1). The vertical axis of FIG. 2D corresponds to a current Ic1 between the cathode 11 and the first anode 21. The vertical axis of FIG. 2E corresponds to a current Ic2 between the cathode 11 and the second anode 22.

As shown in FIG. 2A, for example, the control signal Sc has a first control value 51 or a second control value S2. The first control value 51 corresponds to a first state ST1. The second control value S2 corresponds to a second state ST2. For example, the first state ST1 transitions to the second state ST2 when the control signal Sc transitions from the first control value 51 to the second control value S2. For example, the second state ST2 transitions to the first state ST1 when the control signal Sc transitions from the second control value S2 to the first control value 51.

Figure 2B:
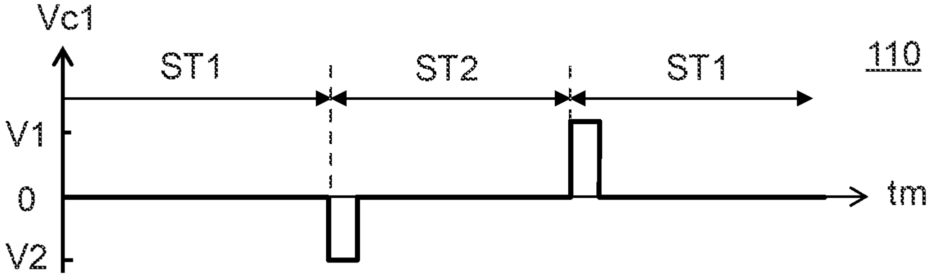
Figure 2C:
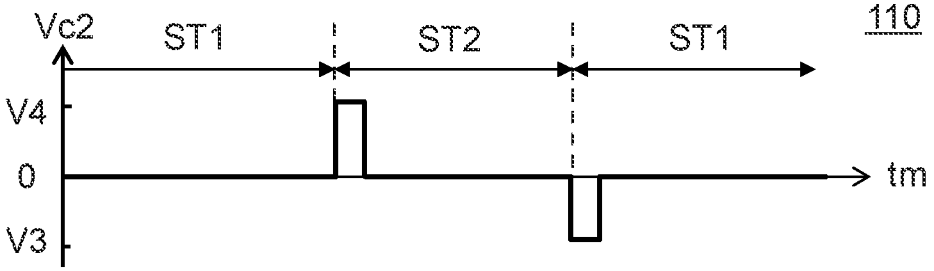
Figure 2D:
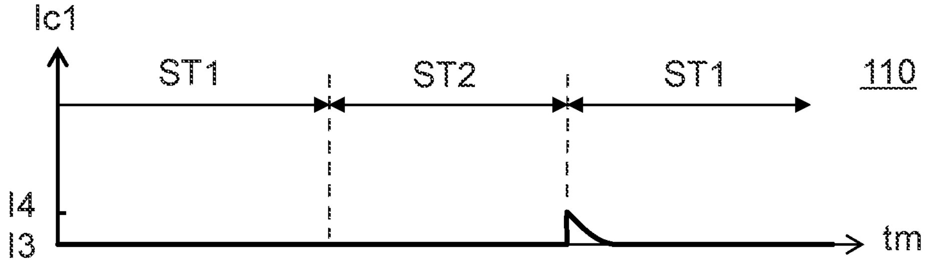
Figure 2E:
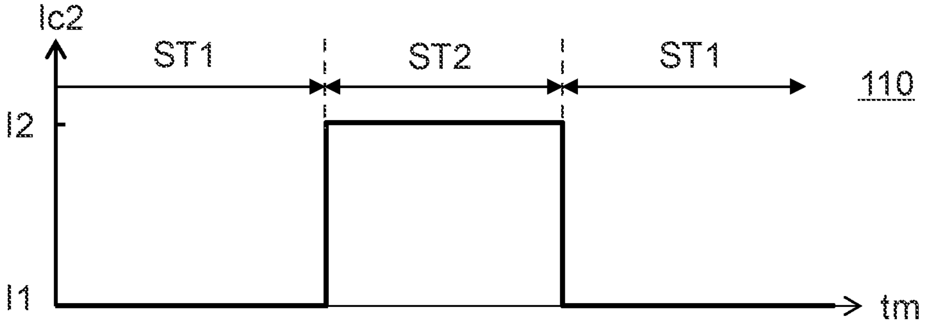

As shown in FIG. 2E, for example, the current Ic2 between the cathode 11 and the second anode 22 is small in the first state ST1. For example, the current Ic2 that flows between the cathode 11 and the second anode 22 in the second state ST2 is large. For example, the current Ic2 does not flow between the cathode 11 and the second anode 22 in the first state ST1. Or, a second current I2 that flows between the cathode 11 and the second anode 22 in the second state ST2 (referring to FIG. 2E) is greater than a first current I1 that flows between the cathode 11 and the second anode 22 in the first state ST1 (referring to FIG. 2E). For example, the second current I2 flows through the current path based on the plasma that is generated in the space between the cathode 11 and the second anode 22 in the second state ST2. A large second current I2 can flow.

As shown in FIG. 2D, the current Ic1 does not flow between the cathode 11 and the first anode 21 in the second state ST2. Or, a third current I3 that flows between the cathode 11 and the first anode 21 in the second state ST2 (referring to FIG. 2D) is less than the second current I2 (referring to FIG. 2E).

In one example as shown in FIG. 2D, a fourth current I4 that flows between the cathode 11 and the first anode 21 after the second state ST2 has transitioned to the first state ST1 is greater than the third current I3. The fourth current I4 is generated by electrons that are emitted from the cathode 11 and reach the first anode 21. In such a case, plasma may be substantially not formed in the current path.

Such a first state ST1 and such a second state ST2 can be formed. The first state ST1 is, for example, the off-state of the switch device 110. The second state ST2 is, for example, the on-state of the switch device 110.

As shown in FIG. 2B, the potential Vc1 of the first conductive part 31 referenced to the cathode 11 is a second potential V2 in at least a portion of the period of the second state ST2. The second state ST2 is transitioned to the first state ST1 by setting the potential Vc1 of the first conductive part 31 referenced to the cathode 11 to a first potential V1 that is greater than the second potential V2 of the first conductive part 31 referenced to the cathode 11 in at least a portion of the period of the second state ST2. For example, the first potential V1 is positive. For example, the second potential V2 may be negative. Such a control of the potentials is performed by operations of the controller 70 based on the control signal Sc.

As shown in FIG. 2C, the potential Vc2 of the second conductive part 32 referenced to the cathode 11 is a fourth potential V4 in at least a portion of the period of the second state ST2. When transitioning from the second state ST2 to the first state ST1, the potential Vc2 of the second conductive part 32 referenced to the cathode 11 is changed to a third potential V3 that is less than the fourth potential V4 of the second conductive part 32 referenced to the cathode 11 in the second state ST2. For example, the fourth potential V4 is positive. For example, the third potential V3 may be negative. Such a control of the potentials is performed by operations of the controller 70 based on the control signal Sc.

For example, the current Ic2 can flow between the cathode 11 and the second anode 22 in the second state ST2. In the second state ST2, electrons are emitted from the cathode 11 and reach the second anode 22. Thereby, the current path is formed between the cathode 11 and the second anode 22 in the second state ST2.

Because the potential Vc1 of the first conductive part 31 becomes the first potential V1 in the second state ST2, the electrons from the cathode 11 reach the first anode 21 instead of the second anode 22. Thereby, the current path is formed between the cathode 11 and the first anode 21. The current path is changed between the first state ST1 and the second state ST2.

After the switching from the second state ST2 to the first state ST1 has ended, the potential Vc1 and the potential Vc2 may be a zero potential or a floating potential. The opposite of the operation described above is performed when switching from the first state ST1 to the second state ST2. For example, the first state ST1 can transition to the second state ST2 by setting the potential Vc1 to the second potential V2. For example, the potential Vc2 is set to the fourth potential V4 when transitioning from the first state ST1 to the second state ST2.

Figure 3A:
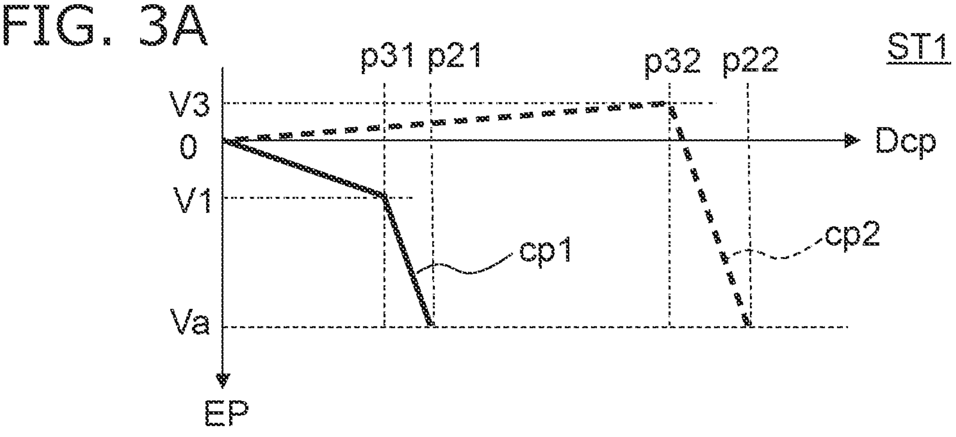
FIGS. 3A and 3B are schematic views illustrating operations of the switch device according to the first embodiment.
Figure 3B:
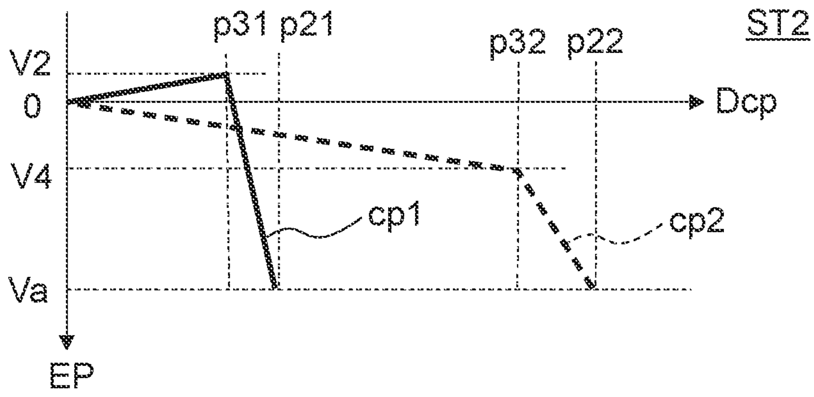

FIGS. 3A and 3B are schematic views illustrating operations of the switch device according to the first embodiment.

In these figures, the horizontal axis is a position Dcp in the current path referenced to the cathode 11. These figures show a position p31 of the first conductive part 31, a position p21 of the first anode 21, a position p32 of the second conductive part 32, and a position p22 of the second anode 22.

In these figures, the vertical axis is a potential EP of the electrons. In these figures, the downward orientation corresponds to the positive orientation of the potential. These figures illustrate a first current path cp1 that is formed between the cathode 11 and the first anode 21, and a second current path cp2 that is formed between the cathode 11 and the second anode 22.

In the first state ST1 as shown in FIG. 3A, the potential EP of the first conductive part 31 is the first potential V1 (the high potential); and the potential EP of the second conductive part 32 is the third potential V3 (the low potential). In the first state ST1, the electrons that are emitted from the cathode 11 travel along the first current path cp1 and reach the first conductive part 31. In the first state ST1, the electrons that are emitted from the cathode 11 substantially do not reach the second conductive part 32.

In the second state ST2 as shown in FIG. 3B, the potential EP of the first conductive part 31 is the second potential V2 (the low potential); and the potential EP of the second conductive part 32 is the fourth potential V4 (the high potential). In the second state ST2, the electrons that are emitted from the cathode 11 travel along the second current path cp2 and reach the second conductive part 32. In the second state ST2, the electrons that are emitted from the cathode 11 substantially do not reach the first conductive part 31.

According to the embodiment, a sustained discharge is generated in the second current path cp2 in the second state ST2. In the first state ST1, the current path is shifted to the first current path cp1 by the electric fields that accompany the potentials of the conductive parts. A stable switching operation is obtained.

Figure 4:
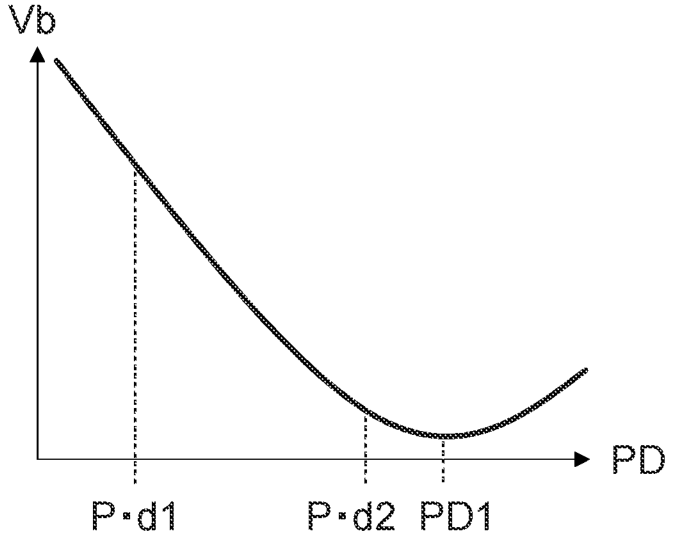
FIG. 4 is a schematic view illustrating a characteristic of the switch device.

FIG. 4 is a schematic view illustrating a characteristic of the switch device.

The horizontal axis of FIG. 4 is a first parameter PD. The first parameter PD is the product of a distance D from the cathode 11 and a pressure P inside the container 50. The vertical axis of FIG. 4 is a dielectric breakdown voltage Vb inside the container 50.

As shown in FIG. 4, the dielectric breakdown voltage Vb has the characteristic of a Paschen curve for the first parameter PD. The dielectric breakdown voltage Vb has a minimum when the first parameter PD has a first value PD1. The first value PD1 is, for example, 1 Pa·m.

According to the embodiment, it is favorable for the product of the first distance d1 and the pressure P in the container 50 (P·d1) to be less than 133.322 Pa·m. The product of the second distance d2 and the pressure P of the gas in the container 50 is less than the first value PD1 (e.g., 1 Pa·m).

For example, the first distance d1 is sufficiently short. The electrons that are emitted from the cathode 11 reach the first conductive part 31 before electron avalanche occurs due to dielectric breakdown. The second distance d2 is the length at which electron avalanche occurs. A stable switching operation is obtained.

According to the embodiment, it is favorable for the product of the first distance d1 and the pressure P in the container 50 (P·d1) to be not less than 0.01 times and not more than 0.25 times the first value PD1 (e.g., 1 Pa·m).

According to the embodiment, for example, it is favorable for the product of the second distance d2 and the pressure P in the container 50 (P·d2) to be not less than 0.5 times and not more than 2 times the first value PD1 (e.g., 1 Pa·m). For example, it is favorable for the second distance d2 to be not less than 2 times and not more than 200 times the first distance d1.

As shown in FIG. 1, the second anode 22 includes a second anode surface 22F that is oriented toward the interior 50S of the container 50. In the example, the second anode surface 22F is along the first direction D1. For example, the second anode surface 22F crosses the second direction D2. Electrons easily are uniformly incident on the second anode surface 22F in the second state ST2. For example, a long life of the second anode 22 is easily obtained.

As shown in FIG. 1, the first anode 21 includes a first anode surface 21F that is oriented toward the interior 50S of the container 50. The first anode surface 21F crosses the first direction D1. Electrons easily are uniformly incident on the first anode surface 21F in the first state ST1. For example, a long life of the first anode 21 is easily obtained.

Several examples of switch devices according to the first embodiment will now be described. A description is omitted for configurations similar to those of the switch device 110 in the following description.

Figure 5:
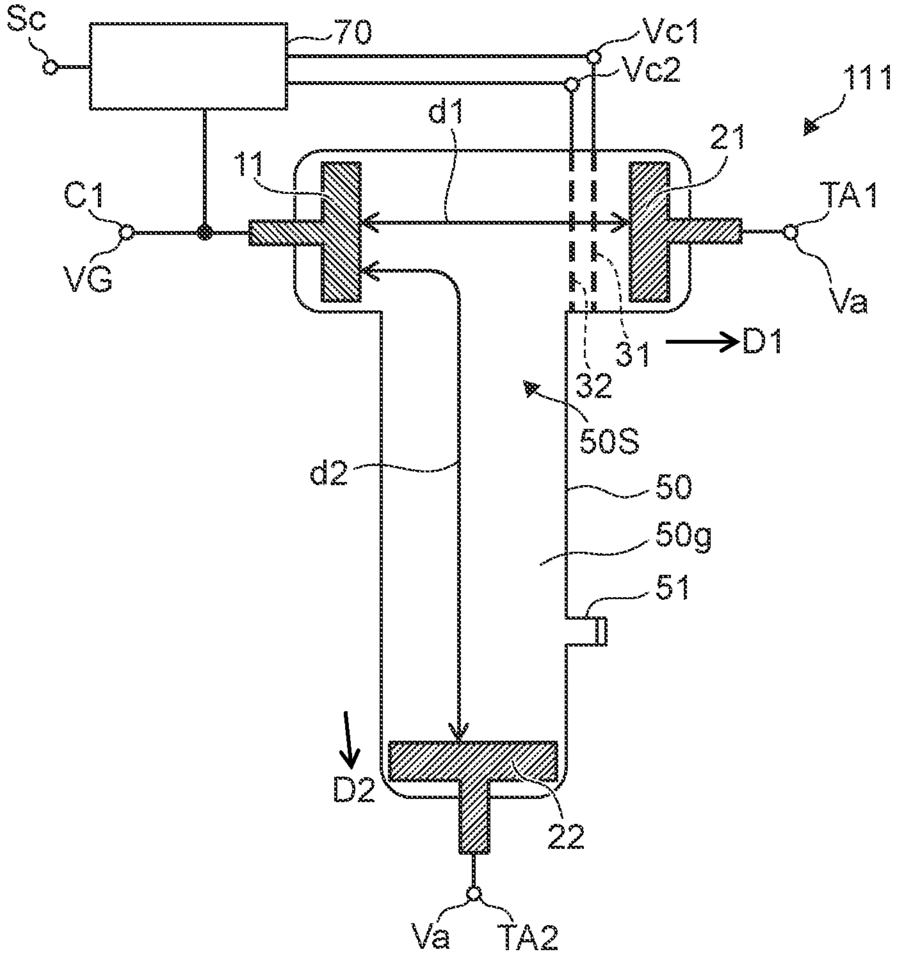
FIG. 5 is a schematic cross-sectional view illustrating a switch device according to the first embodiment.

FIG. 5 is a schematic cross-sectional view illustrating a switch device according to the first embodiment.

As shown in FIG. 5, the switch device 111 also includes the first conductive part 31 and the second conductive part 32. In the switch device 111, the first conductive part 31 is located between the second conductive part 32 and the first anode 21 in the first direction D1.

FIGS. 6A and 6B are graphs illustrating operations of the switch device according to the first embodiment.

These figures illustrate the potentials of the conductive parts of the switch device 111. The vertical axis of FIG. 6A corresponds to the potential Vc1 of the first conductive part 31 (referring to FIG. 5). The vertical axis of FIG. 6B corresponds to the potential Vc2 of the second conductive part 32 (referring to FIG. 5). The control signal Sc, the current Ic1, and the current Ic2 of the switch device 111 may be similar to the examples shown in FIG. 2A, FIG. 2D, and FIG. 2E.

As shown in FIG. 6A, for example, the potential Vc1 of the first conductive part 31 may be similar to the example shown in FIG. 2B. In other words, the second state ST2 is transitioned to the first state ST1 by setting the potential Vc1 of the first conductive part 31 referenced to the cathode 11 to the first potential V1 that is greater than the second potential V2 of the first conductive part 31 referenced to the cathode 11 in at least a portion of the period of the second state ST2. For example, the first potential V1 is positive. For example, the second potential V2 may be negative.

As shown in FIG. 6B, the potential Vc2 of the second conductive part 32 is, for example, a positive potential VE2. At least one of the first potential V1 or the second potential V2 can be regulated by regulating the potential VE2.

The position of the first conductive part 31 and the position of the second conductive part 32 may be interchanged in the switch device 111.

FIG. 7 is a schematic cross-sectional view illustrating a switch device according to the first embodiment.

As shown in FIG. 7, the switch device 112 includes the container 50, the cathode 11, the first anode 21, the second anode 22, the first conductive part 31, and the second conductive part 32. In the switch device 112 as well, the second direction D2 from the cathode 11 toward the second anode 22 crosses the first direction D1 from the cathode 11 toward the first anode 21. The second distance d2 between the cathode 11 and the second anode 22 is greater than the first distance d1 between the cathode 11 and the first anode 21. The second anode 22 includes the second anode surface 22F that is oriented toward the interior 50S of the container 50. The second anode surface 22F crosses the first direction D1. In the switch device 112, the electrons are incident on the second anode surface 22F along the first direction D1. Stable operations are obtained.

In the switch device 112 as shown in FIG. 7, the first conductive part 31 is around at least a portion of the first anode 21. The second conductive part 32 is around the first conductive part 31. The current path is easily controlled more stably. The potentials of the first and second conductive parts 31 and 32 of the switch device 112 may be similar to those of the switch device 111.

Figure 8:
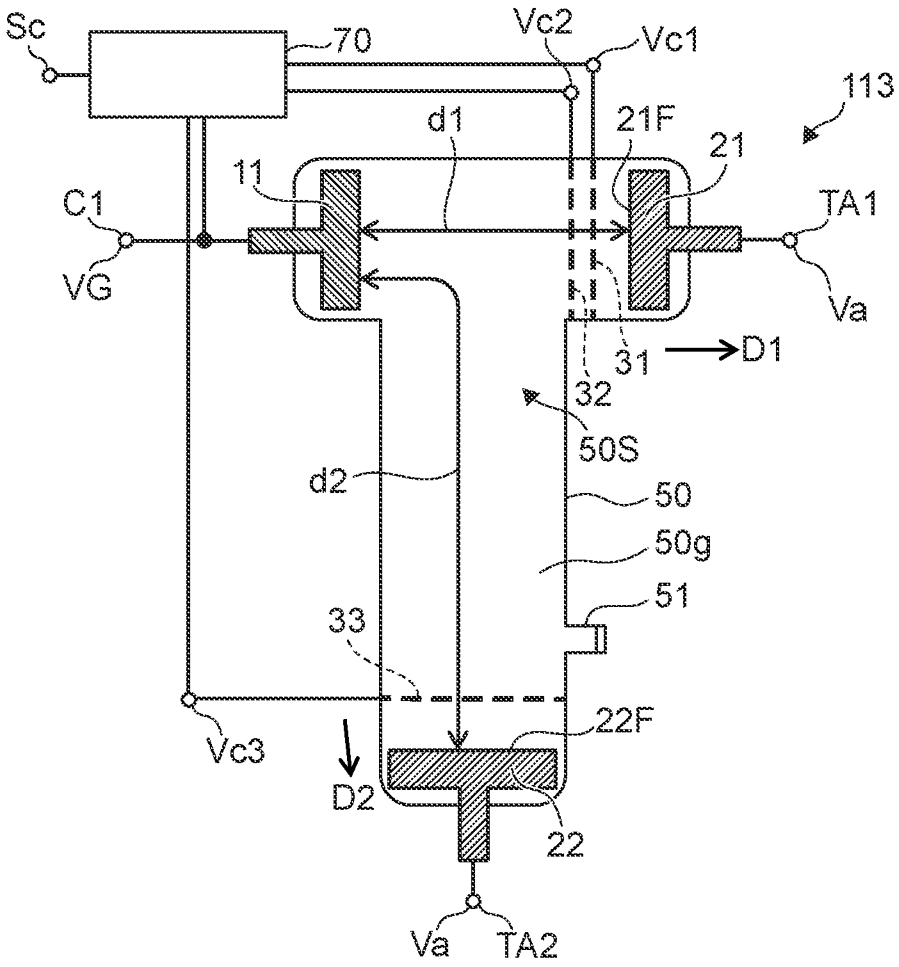
FIG. 8 is a schematic cross-sectional view illustrating a switch device according to the first embodiment.

FIG. 8 is a schematic cross-sectional view illustrating a switch device according to the first embodiment.

As shown in FIG. 8, the switch device 113 includes a third conductive part 33 in addition to the container 50, the cathode 11, the first anode 21, the second anode 22, the first conductive part 31, and the second conductive part 32. In the switch device 113, the first conductive part 31 is located between the second conductive part 32 and the first anode 21 in the first direction D1.

In the switch device 113 as well, the second direction D2 from the cathode 11 toward the second anode 22 crosses the first direction D1 from the cathode 11 toward the first anode 21. The second distance d2 is greater than the first distance d1. The position in the second direction D2 of the third conductive part 33 is between the position in the second direction D2 of the cathode 11 and the position in the second direction D2 of the second anode 22.

An example of potentials of the conductive parts of the switch device 113 will now be described.

Figure 9A:
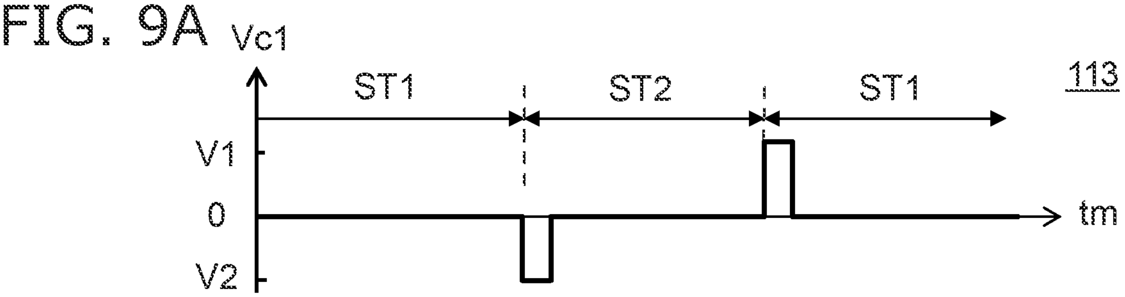
FIGS. 9A to 9C are graphs illustrating operations of the switch device according to the first embodiment.
Figure 9B:
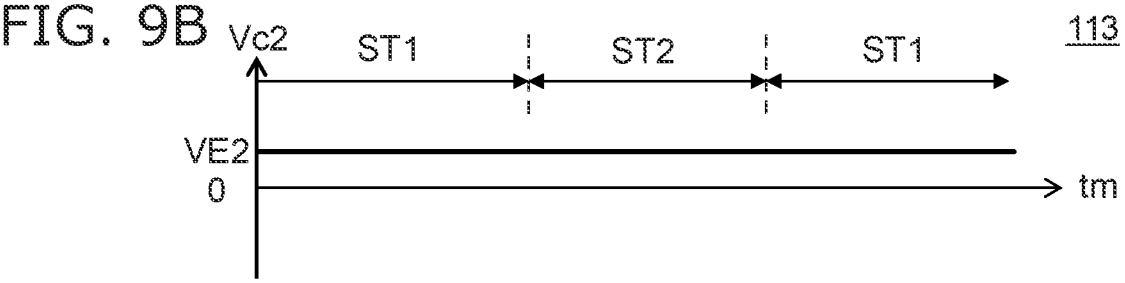
Figure 9C:
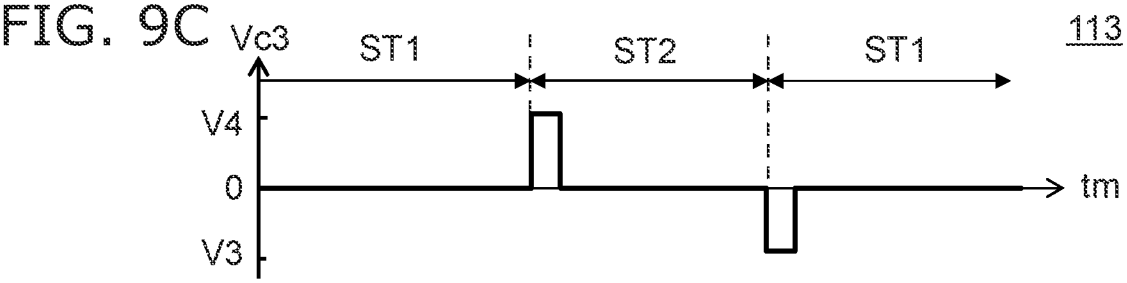

FIGS. 9A to 9C are graphs illustrating operations of the switch device according to the first embodiment.

These figures illustrate the potentials of the conductive parts of the switch device 113. The vertical axis of FIG. 9A corresponds to the potential Vc1 of the first conductive part 31 (referring to FIG. 8). The vertical axis of FIG. 9B corresponds to the potential Vc2 of the second conductive part 32 (referring to FIG. 8). The vertical axis of FIG. 9C corresponds to a potential Vc3 of the third conductive part 33 (referring to FIG. 8). The control signal Sc, the current Ic1, and the current Ic2 of the switch device 113 may be similar to the examples shown in FIG. 2A, FIG. 2D, and FIG. 2E.

In the switch device 113 as shown in FIGS. 9A and 9B, the potential Vc1 of the first conductive part 31 and the potential Vc2 of the second conductive part 32 may be similar to the examples described with reference to FIGS. 6A and 6B. As shown in FIG. 9C, the potential Vc3 of the third conductive part 33 may be similar to the example of the potential Vc2 described with reference to FIG. 2C.

For example, when transitioning from the second state ST2 to the first state ST1, the potential Vc3 of the third conductive part 33 referenced to the cathode 11 is set to a potential (e.g., the third potential V3) that is less than the potential (e.g., the fourth potential V4) of the third conductive part 33 referenced to the cathode 11 in at least a portion of the period of the second state ST2.

Figure 10:
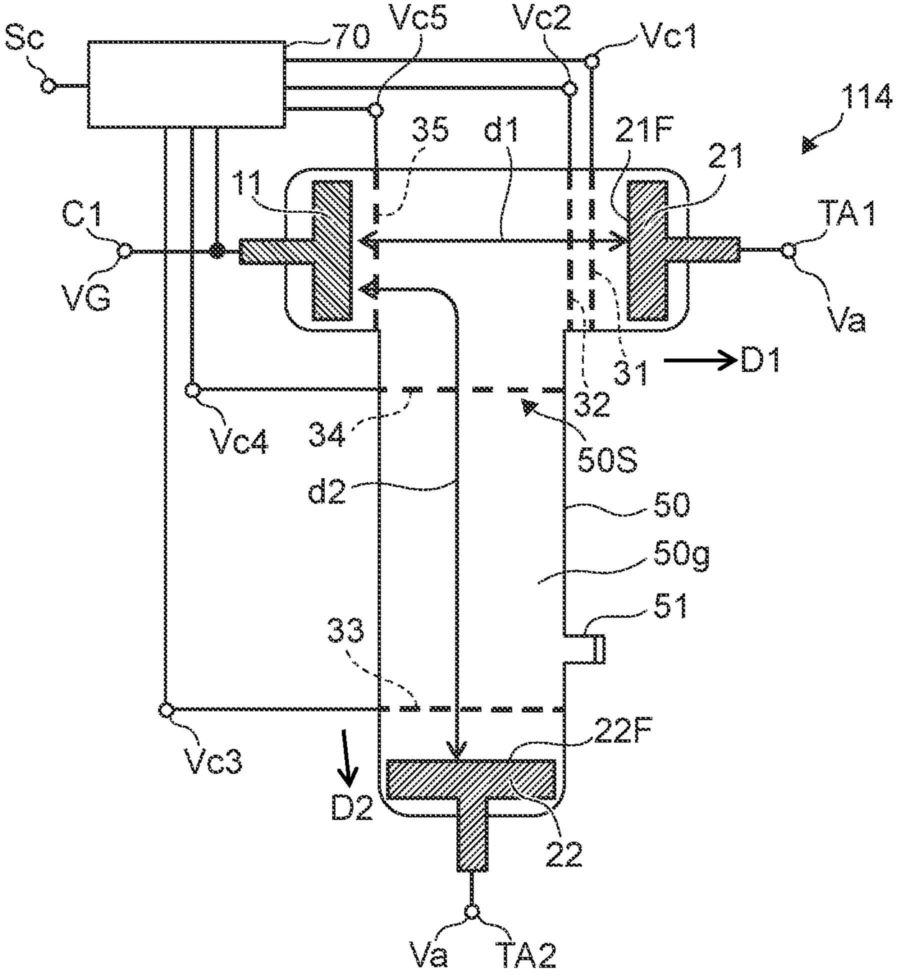
FIG. 10 is a schematic cross-sectional view illustrating a switch device according to the first embodiment.

FIG. 10 is a schematic cross-sectional view illustrating a switch device according to the first embodiment.

As shown in FIG. 10, the switch device 114 includes a fourth conductive part 34 and a fifth conductive part 35 in addition to the container 50, the cathode 11, the first anode 21, the second anode 22, the first conductive part 31, the second conductive part 32, and the third conductive part 33. In the switch device 114, the first conductive part 31 is located between the second conductive part 32 and the first anode 21 in the first direction D1. The position in the second direction D2 of the third conductive part 33 is between the position in the second direction D2 of the cathode 11 and the position in the second direction D2 of the second anode 22.

For example, the position in the second direction D2 of the fourth conductive part 34 is between the position in the second direction D2 of the cathode 11 and the position in the second direction D2 of the third conductive part 33. For example, the position in the first direction D1 of the fifth conductive part 35 is between the position in the first direction D1 of the cathode 11 and the position in the second direction D2 of the second conductive part 32.

The controller 70 is configured to control the potential Vc1 of the first conductive part 31, the potential Vc2 of the second conductive part 32, the potential Vc3 of the third conductive part 33, a potential Vc4 of the fourth conductive part 34, and a potential Vc5 of the fifth conductive part 35.

An example of potentials of the conductive parts of the switch device 114 will now be described.

FIGS. 11A to 11E are graphs illustrating operations of the switch device according to the first embodiment.

These figures illustrate the potentials of the conductive parts of the switch device 114. The vertical axis of FIG. 11A corresponds to the potential Vc1 of the first conductive part 31 (referring to FIG. 10). The vertical axis of FIG. 11B corresponds to the potential Vc2 of the second conductive part 32 (referring to FIG. 10). The vertical axis of FIG. 11C corresponds to the potential Vc3 of the third conductive part 33 (referring to FIG. 10). The vertical axis of FIG. 11D corresponds to the potential Vc4 of the fourth conductive part 34 (referring to FIG. 10). The vertical axis of FIG. 11E corresponds to the potential Vc5 of the fifth conductive part 35 (referring to FIG. 10). The control signal Sc, the current Ic1, and the current Ic2 of the switch device 114 may be similar to the examples shown in FIG. 2A, FIG. 2D, and FIG. 2E.

Figure 11A:
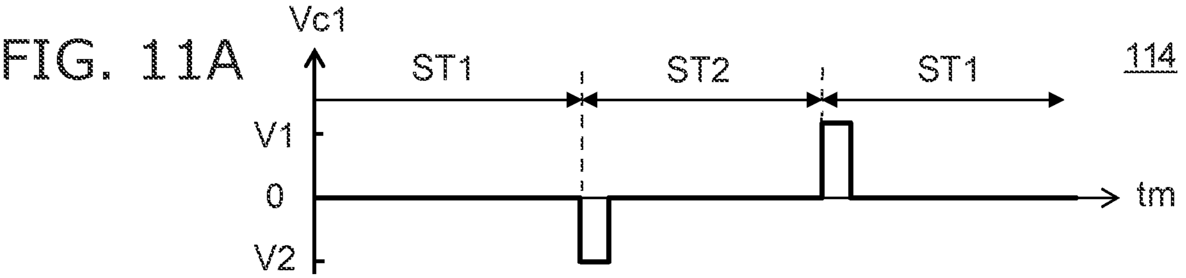
FIGS. 11A to 11E are graphs illustrating operations of the switch device according to the first embodiment.
Figure 11B:
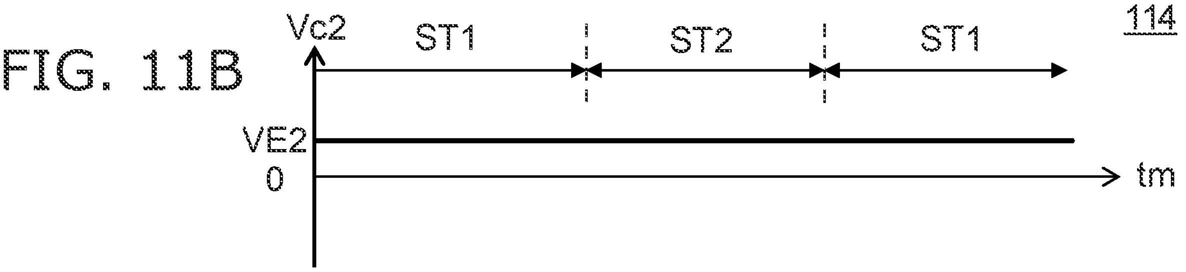
Figure 11C:
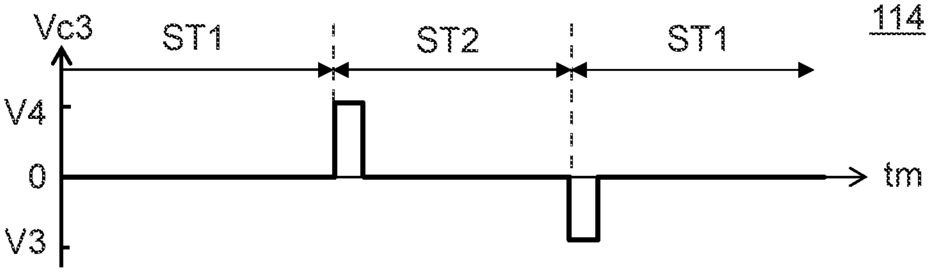
Figure 11D:
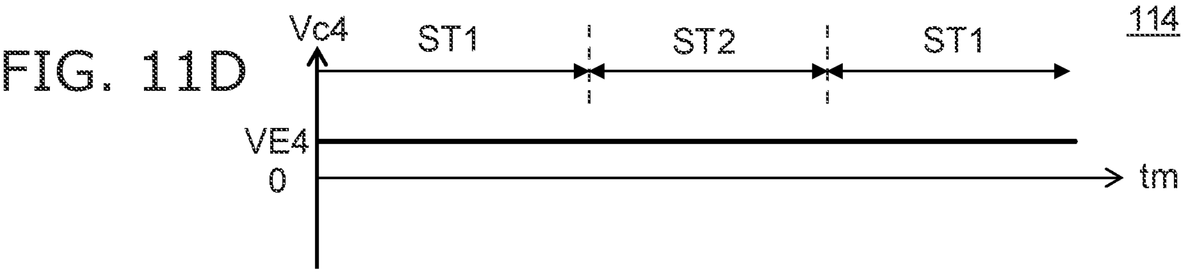
Figure 11E:
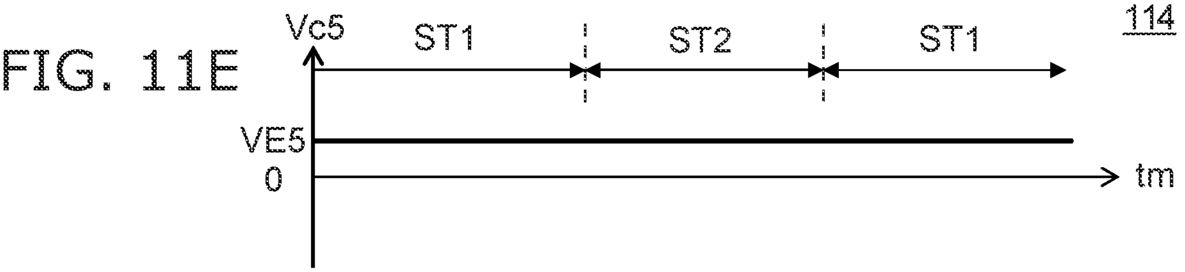

In the switch device 114 as shown in FIGS. 11A and 11B, the potential Vc1 and the potential Vc2 may be similar to the examples described with reference to FIGS. 6A and 6B. As shown in FIG. 11C, the potential Vc3 may be similar to the example of the potential Vc2 described with reference to FIG. 2C. For example, when transitioning from the second state ST2 to the first state ST1, the potential Vc3 of the third conductive part 33 referenced to the cathode 11 is set to a potential (e.g., the third potential V3) that is less than a potential (e.g., the fourth potential V4) of the third conductive part 33 referenced to the cathode 11 in at least a portion of the period of the second state ST2. As shown in FIG. 11D, the potential Vc4 of the fourth conductive part 34 is, for example, a potential VE4. At least one of the third potential V3 or the fourth potential V4 can be regulated by regulating the potential VE4. As shown in FIG. 11E, the potential Vc5 of the fifth conductive part 35 is, for example, a potential VE5. At least one of the first potential V1, the second potential V2, the third potential V3, the fourth potential V4, the potential VE2, or the potential VE4 can be regulated by regulating the potential VE5.

Second Embodiment

Figure 12:
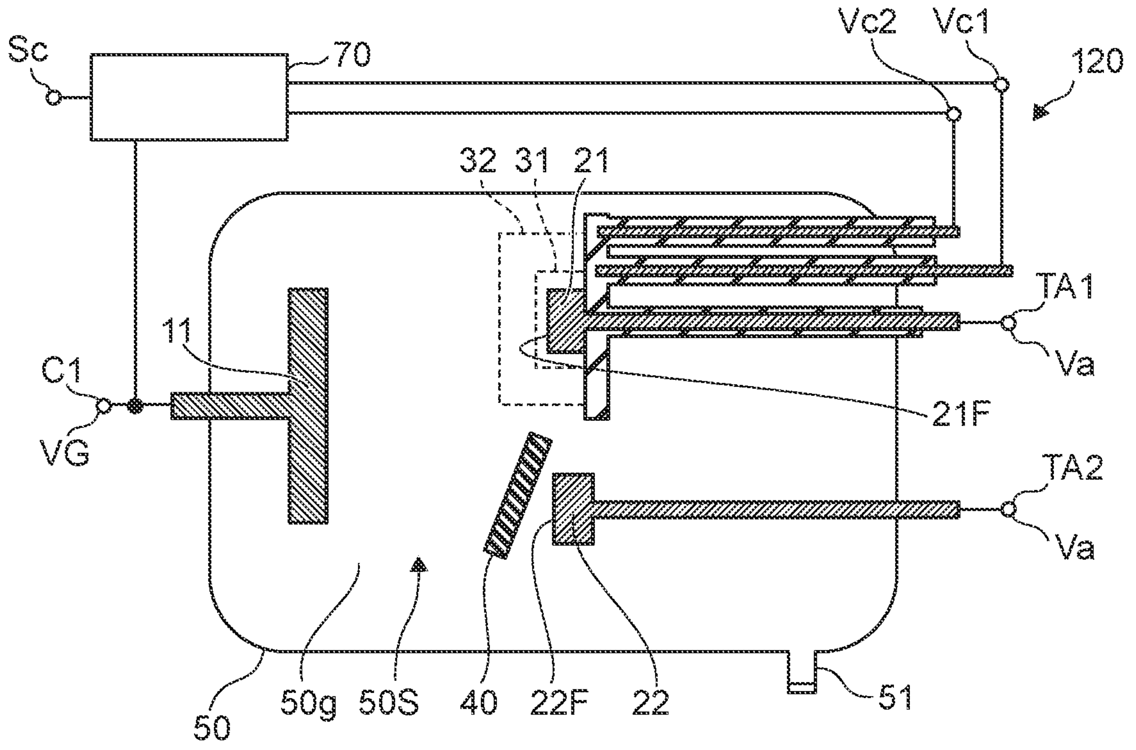
FIG. 12 is a schematic cross-sectional view illustrating a switch device according to a second embodiment.

FIG. 12 is a schematic cross-sectional view illustrating a switch device according to a second embodiment.

As shown in FIG. 12, the switch device 120 according to the second embodiment includes the container 50, the cathode 11, the first anode 21, the second anode 22, and an insulating member 40.

The container 50 is configured to house the gas 50*g*. The cathode 11, the first anode 21, the second anode 22, and the insulating member 40 are located in the container 50. The insulating member 40 is located between the cathode 11 and the second anode 22. In the example, the first conductive part 31 is located between the second conductive part 32 and the first anode 21.

The switch device 120 may include the controller 70. The controller 70 may be configured to control at least one of the potential Vc1 of the first conductive part 31 or the potential Vc2 of the second conductive part 32. For example, the control of the switch device 120 may be performed as described with reference to FIGS. 6A and 6B.

In the switch device 120 as well, a switch device can be provided in which the characteristics can be improved. For example, a power-conserving switch device can be provided. For example, a long life is obtained. For example, the switching of a large current is possible. The third to fifth conductive parts 33 to 35, etc., may be provided in the second embodiment.

According to embodiments, a switch device can be provided in which the characteristics can be improved.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in switch devices such as cathodes, anodes, conductive parts, insulating members, containers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all switch devices practicable by an appropriate design modification by one skilled in the art based on the switch devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A switch device, comprising:
a container configured to house a gas;
a cathode located in the container;
a first anode located in the container; and
a second anode located in the container,
a second direction from the cathode toward the second anode crossing a first direction from the cathode toward the first anode,
a second distance between the cathode and the second anode being greater than a first distance between the cathode and the first anode.

2. The device according to claim 1, wherein
a product of the first distance and a pressure of a gas in the container is less than 1 Pa·m.

3. The device according to claim 1, wherein
a current does not flow between the cathode and the second anode in a first state, or
a second current flowing between the cathode and the second anode in a second state is greater than a first current flowing between the cathode and the second anode in the first state.

4. The device according to claim 3, wherein
a current does not flow between the cathode and the first anode in the second state, or
a third current is less than the second current and flows between the cathode and the first anode in the second state.

5. The device according to claim 4, wherein
a fourth current is greater than the third current and flows between the cathode and the first anode after a transition from the second state to the first state.

6. The device according to claim 5, further comprising:
a first conductive part,
a position in the first direction of the first conductive part being between a position in the first direction of the cathode and a position in the first direction of the first anode,
the second state being transitioned to the first state by setting a potential of the first conductive part referenced to the cathode to a first potential,
the first potential being greater than a second potential of the first conductive part referenced to the cathode in at least a portion of a period of the second state.

7. The device according to claim 6, wherein
the first potential is positive, and
the second potential is negative.

8. The device according to claim 6, wherein
the first conductive part is between the cathode and the first anode in the container.

9. The device according to claim 6, further comprising:
a controller electrically connected with the first conductive part,
the controller being configured to control the potential of the first conductive part.

10. The device according to claim 6, further comprising:
a second conductive part,
a position in the second direction of the second conductive part being between a position in the second direction of the cathode and a position in the second direction of the second anode,
a potential of the second conductive part referenced to the cathode being set to a third potential in the transitioning from the second state to the first state,
the third potential being less than a fourth potential of the second conductive part referenced to the cathode in at least a portion of a period of the second state.

11. The device according to claim 10, wherein
the fourth potential is positive, and
the third potential is negative.

12. The device according to claim 10, further comprising:
a controller electrically connected with the first and second conductive parts,
the controller being configured to control the potential of the first conductive part and the potential of the second conductive part.

13. The device according to claim 6, further comprising:
a second conductive part,
the first conductive part being located between the second conductive part and the first anode.

14. The device according to claim 13, further comprising:
a third conductive part,
a position in the second direction of the third conductive part being between a position in the second direction of the cathode and a position in the second direction of the second anode,
a potential of the third conductive part referenced to the cathode in the transitioning from the second state to the first state being set to a potential less than the potential of the third conductive part referenced to the cathode in the second state.

15. The device according to claim 14, further comprising:
a fourth conductive part,
a position in the second direction of the fourth conductive part being between the position in the second direction of the cathode and the position in the second direction of the third conductive part.

16. The device according to claim 1, wherein
the second anode includes a second anode surface oriented toward an interior of the container, and
the second anode surface is along the first direction.

17. The device according to claim 1, wherein
the second anode includes a second anode surface oriented toward an interior of the container, and
the second anode surface crosses the first direction.

18. The device according to claim 1, further comprising:
a gas located in the container,
the gas including at least one of argon, helium, hydrogen, or deuterium.

19. The device according to claim 1, wherein
plasma is generated in at least a portion of a space between the cathode and the second anode in the second state.

* * * * *